UNITED STATES PATENT OFFICE.

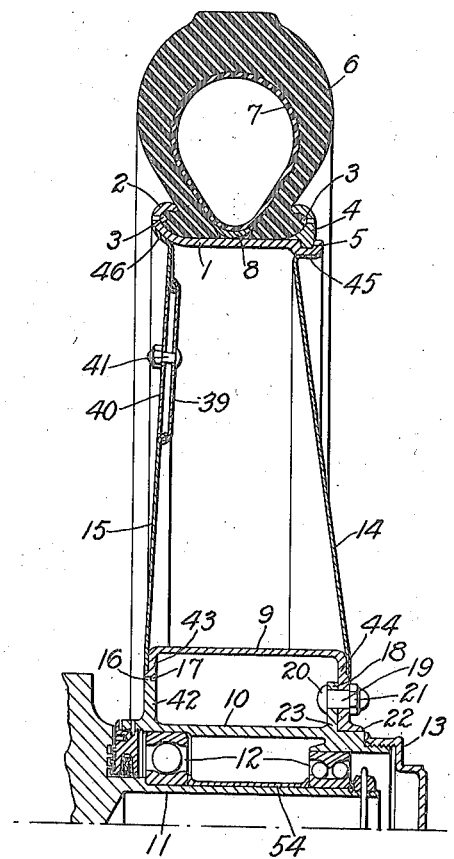

WILLIAM J. P. MOORE, OF NEW YORK, N. Y.

METHOD OF MAKING WHEELS.

1,266,844.

Specification of Letters Patent.

Patented May 21, 1918.

Application filed January 3, 1916. Serial No. 69,825.

*To all whom it may concern:*

Be it known that I, WILLIAM J. P. MOORE, a citizen of the United States, residing at New York, in the county of New York and State of New York, have invented certain new and useful Improvements in Methods of Making Wheels, of which the following is a specification, reference being had therein to the accompanying drawing.
My present invention refers to a tension wheel, the parts of which are brought together and united under a strong tension. The object is to secure a stiff and durable construction which will be inexpensive, light, attractive, strong, and of sufficient resiliency for its purpose. The invention comprises essentially a wheel having an outer circular member, and an inner central member, together with a pair of annular disks between said members to which they are effectively secured by means of welding; and the wheel so constructed is mounted in such a manner that it can be readily removed from the axle whenever desired for the substitution of a new wheel, for the purpose of providing a new tire after one is punctured or has a blow-out or other injury, as well as for other purposes; and the invention also includes various details and peculiarities of the essential combination just expressed to adapt the invention for use with the driving or driven wheels of automobiles or other vehicles; and further, it comprises numerous features and special elements in the construction, arrangement and combination of the various parts, substantially as will be hereinafter described and claimed.

In the accompanying drawing illustrating my invention:

Figure 1 is a cross-section of half of my improved wheel, the same being ordinarily the front wheel of an automobile.

Fig. 2 is a similar cross-section of half of my improved wheel in another form, its construction embodying therein a brake drum, and being usually intended for the rear wheel of an automobile.

Similar characters of reference designate corresponding parts throughout the different figures of the drawing.

Referring first to the particular style of wheel shown in Fig. 1, which is a wheel to be used as the front wheel or driven wheel of an automobile, 1 designates an outer circular member of the wheel, which serves as the rim of the wheel, and which has the oppositely-located curved circumferential flanges 2 and 4, said flange 2 being integral with the rim 1, while the flange 4 is a separate piece and consists of a detachable ring which is seated in a groove 5 formed in the face of the rim 1 on the edge thereof opposite to where the integral flange 2 is located. The flange 2 and the flange 4 are provided with oppositely-located inwardly-projecting prongs or barbs 3, which are designed to prick into the substance of the rubber shoe 6 and engage the same without injury thereto but with a sufficiently tenacious grasp to hold the shoe in place and prevent any creeping or displacement.

For the purpose of better explaining the application of the invention, I have delineated the shoe 6 and the inner inflatable tube 7, together with a strip 8 beneath the latter, all in position within the flanges of the clencher rim.

At the center of the wheel is the hub 10, provided with a dust cap 13, the axle 11, and the ball bearings 12 between the hub 10 and the axle 11, all arranged to operate in an easy and effective manner. The hub 10 is provided near one end with an encircling flange 42 and near its other end with a similar encircling flange 18. The flange 42 has a shoulder thereon. Surrounding the hub 10 is a ring 9 having a flange 43 provided with a rabbeted edge 17 which engages the shoulder 16 of the hub 10, said ring 9 also being provided with a flange 44 which lies alongside and outside of the hub flange 18, said flange 44 being of a substantial width and having a circular central opening 22 which fits around a smooth circular face 23 on the hub 10. In this way the inner ring or member 9 can be slipped neatly and tightly over and upon the hub by having the rabbeted flange 43 engaging the shouldered flange 42 and the flange 44 engaging the hub flange 18, the parts being held in this position in any suitable manner and by any preferred means, for example, by bolts 19 whose head 20 fits against the inside of the flange 18, while the outer end is provided with a nut 21, which clamps tightly against the outside of the flange 44. The head 20 as shown is welded or otherwise secured to inside of flange 18.

Between the outer circular rim 1 and the inner or central member 9 are two annular disks 14 and 15, an inner and an outer one, which are of thin steel or some other suitable metal or material. The outer peripheral edges of these annular disks 14 and 15 are bent at an angle as much as may be desired to conform them to the shape of the rim 1 at the edges thereof, as for example, the annular disk 14 is bent to form the flange 45 and the peripheral outer edge of the other disk 15 is bent to form the flange 46. These two flanges 45 and 46 are secured to the rim 1 by welding, so that the junction will be absolutely strong and complete. The inner peripheral edges of the annular disks 14 and 15 are welded to the central member 9 at the opposite ends thereof, being shown in the present example of the invention as overlapping the flanges 43 and 44, and being welded to the outer faces thereof, said flanges being slightly indented to receive the thickness of the disks 14 and 15, and enable them to be united to the flanges 43 and 44 so as to be flush with the faces of said flanges.

I have just described the construction shown in Fig. 1, which describes a driven wheel which will be commonly known as the front wheel. In Fig. 2 I have delineated my novel features in the form of a wheel intended generally for use as the rear wheel, and containing a brake drum, brake shoes, etc. In this form of wheel 33 denotes the driving shaft, 38 the ball bearings, 47 the axle, 48 the hub cap, 32 the hub, 31 the brake drum, which contains certain brake parts, as for instance, the shoes 49, while the inside opening into the drum 31 is covered by the side disk or plate 34. The brake drum 31 is removably connected to the hub 32 by having the side thereof bolted by means of bolts 37, or some other similar securing devices, to a flange 36 on the hub 32. The cover plate 34 is secured to the axle 47 by means of bolts 35, or some other suitable fastening means. In this Fig. 2, the central inner member consists of the brake drum 31, which, as I have said before, is removably connected to the hub 32. The outer circular member of the wheel or the rim thereof, which may be of the clencher or other variety, consists of a rim 24 having the curved peripheral flange 25 on the one side, and the detachable flange 27 on the opposite side held in the groove 28 in the ring 24, both the integral flange 25 and the detachable flange 27 being provided with inner prongs or barbs 26 to engage the rubber shoe 6 which contains the inflatable inner tube 7, as in Fig. 1 of the drawing.

Between the outer circular member or rim 24 and the inner central member, which in this case is the brake drum 31, I arrange a pair of annular disks 29 and 30 whose outer peripheral edges are respectively bent at 50 and 51 and are welded to the clencher rim, and whose inner peripheral edges are welded to the brake drum 31, the mode of welding to the drum 31 preferably being the same as that by which the disks 14 and 15 are welded to the ring 9, namely: by welding the circular inner edges of said disks 29 and 30 in rabbets in the opposite edges of the said drum 31 so that the disks 29 and 30 may lie flush with the faces of said drum.

The inner tube 7 of the tire requires, of course, an air valve of the usual or some other kind, and in Fig. 2 I have indicated such a valve at 42, having thereon the dust cap 43, said valve projecting through an opening 52 in the clencher rim 24. Said valve 42 is provided with the usual plate 53 which prevents creeping of the tire, and also I find it convenient to utilize a strip of rubber or fabric 8 (see Figs. 1 and 2) which is located between the flanges of the shoe 6 and between the inner tube and the rim. With a wheel constructed with welded disks, as I have just described, it may be essential to provide some way of access into the space between the two disks in order to operate the air valve 42 and inflate the inner tube. I, therefore, provide one of the disks, as for example disk 15 in Fig. 1, and disk 30 in Fig. 2, with an oval hand hole, which is closed by a suitable cover, an example of which I have shown as consisting of an inner plate 39, having a peripheral lip which engages a similar lip on the edge of the oval hand hole, while outside of the disk is a plate 40. The two plates 39 and 40 are bolted together firmly by means of a bolt 41, or some other equivalent device. The cover, therefore, is readily taken off the hand hole by loosening the bolt 41 so that access can be had to the air valve or the space between the disks for any other purpose, and then the parts can be readily restored and locked firmly in position as before.

The welding of the disks to the inner and outer members of the wheel provides an effective, simple and strong combination, which will be very durable, as it will be practically indestructible and which cannot easily be broken or disordered. A wheel constructed in the manner I have specified can be quickly dismounted from the hub to allow another wheel to be substituted. With the construction shown in Fig. 1, all the user needs to do is remove the nuts 21, when the ring 9, as well as all the connected parts, can be readily withdrawn from the hub, the circular member 22 slipping easily off the hub and the rabbeted edge 17 disengaging itself with facility from the shoulder 16. With the form of wheel shown in Fig. 2, an equally easy removal may be effected by simply removing the nuts 21$^a$ so that the drum 31 may be dislodged from its position on the hub 32. The bolts 37 have heads 20ª welded or otherwise secured to flange 36. Many changes in the precise construction and arrangement of the manifold details of structure and combination may be made without destroying the effect or value of the invention, but rather promoting and enhancing its range of application and its value in practice, and I reserve the liberty of modifying and rearranging and changing the details of the specimens in which the invention is embodied in the practical ways for adapting and applying the same within wide limits; as for example, if desired, I may use spacing rings 54 for separating the raceways of the balls belonging to the separate parts of the bearing 12 and similarly with the bearings 38; changes may also be made in the particular way in which the central member, which in one case is ring 9, and in the other case is the brake drum 31, is mounted removably on the hub, as the details of such mounting may be changed in a great variety of ways, and also in other portions of the invention similar modifications may be made without going beyond its scope. I have emphasized the welding of the disks to the outer circular member and the inner central member. In further explanation of this I wish to lay equally strong emphasis upon the method of placing these disks under tension, which consists in heating the entire surface of the disks to a high degree during the welding process, so that while they are being welded and a firm connection is being made between the disks and the inner and outer members, the cooling will cause a contraction such as will place these disks under a very strong tension and thus make the wheel stiff and efficient.

Having thus described my invention, what I claim as new and desire to secure by Letters Patent, is:

1. The herein described method of making wheels, which consists of heating a pair of annular disks throughout their entire material and welding the same to an outer circular member and an inner central member so that said disks will be placed under tension in cooling.

2. The herein described method of making wheels, which consists of heating a pair of annular disks throughout, welding them to an outer circular member and an inner central member, and then allowing the disks to cool so that all the parts may be united together and the disks placed under an effective tension.

In testimony whereof I affix my signature.

WILLIAM J. P. MOORE.